US012784569B2

(12) United States Patent
Kasper et al.

(10) Patent No.: US 12,784,569 B2
(45) Date of Patent: Nov. 3, 2026

(54) SYSTEM FOR PROXIMITY-BASED NOTIFICATION OF PERSONNEL WITHIN GEOGRAPHICAL SPACES

(71) Applicant: Blackline Safety Corp, Calgary (CA)

(72) Inventors: Lisa Kasper, Calgary (CA); Marko Milutinovic, Calgary (CA); Kyleigh Birce, Calgary (CA); Glenn Boyd, Calgary (CA); Kirk Johnson, Calgary (CA)

(73) Assignee: BLACKLINE SAFETY CORP., Calgary (CA)

( * ) Notice: Subject to any disclaimer, the term of this patent is extended or adjusted under 35 U.S.C. 154(b) by 0 days.

(21) Appl. No.: 18/920,720

(22) Filed: Oct. 18, 2024

(65) Prior Publication Data

US 2026/0112261 A1 Apr. 23, 2026

(51) Int. Cl.

| | |
|---|---|
| ***G08B 21/14*** | (2006.01) |
| ***G01S 1/68*** | (2006.01) |
| ***G08B 7/06*** | (2006.01) |
| ***G08B 21/18*** | (2006.01) |
| ***G08B 21/22*** | (2006.01) |
| ***G08B 25/10*** | (2006.01) |
| ***H04B 17/318*** | (2015.01) |

(52) U.S. Cl.

CPC ................ *G08B 21/14* (2013.01); *G01S 1/68* (2013.01); *G08B 7/06* (2013.01); *G08B 21/182* (2013.01); *G08B 21/22* (2013.01); *G08B 25/10* (2013.01); *H04B 17/318* (2015.01)

(58) Field of Classification Search

None

See application file for complete search history.

(56) References Cited

U.S. PATENT DOCUMENTS

| | | | | |
|---|---|---|---|---|
| 2016/0121487 | A1* | 5/2016 | Mohan | B25J 9/0084 700/250 |
| 2018/0240318 | A1* | 8/2018 | Haynes | H04W 12/50 |
| 2021/0074141 | A1* | 3/2021 | Thompson | G08B 7/06 |
| 2021/0335488 | A1* | 10/2021 | Higginson | G16H 40/40 |
| 2022/0303724 | A1* | 9/2022 | Ahrens | G08B 25/006 |

* cited by examiner

*Primary Examiner* — Thomas S McCormack

(74) *Attorney, Agent, or Firm* — McCoy Russell LLP

(57) ABSTRACT

Systems for managing hazard events and notification of personnel within geographical spaces are described. The system includes alarm devices (ADs) having an AD processor, local data storage and transceiver configured to connect to a wide area network (WAN) to send and receive AD data to a central computer system (CCS); a global navigation satellite system (GNSS) receiver configured to the AD processor and to receive GNSS signals, determine AD geographic position and report AD geographic position to the CCS; the AD processor configured to receive alarm data and deliver an alarm; the CCS configured to store one or more pre-defined alarm boundaries for a hazard risk; receive AD geographic positions from one or more ADs; receive alert data from one or more ADs and based on the location of an AD determine if an AD is inside or outside the pre-determined alarm boundary for the hazard risk.

32 Claims, 7 Drawing Sheets

SYSTEM FOR PROXIMITY-BASED NOTIFICATION OF PERSONNEL WITHIN GEOGRAPHICAL SPACES

TECHNICAL FIELD

The disclosure relates to systems and methods for managing hazard events and notification of personnel within geographical spaces.

BACKGROUND

Area Gas Monitors (AGMs) and Personal Gas Monitors (PGMs) are used by industry to detect the presence of environmental gas hazards that may be explosive, toxic or asphyxiating. Lone Worker Monitors (LWMs) are used to monitor the safety of personnel working alone and are used to detect when personnel may be unresponsive or need assistance, such as through the result of a fall, health event or need for roadside assistance. These monitors are configured to provide local alarms to users/workers and alert remote stakeholders to enhance worker safety within a wide variety of workspaces.

AGMs are devices that monitor gas across or within a larger workspace area such as at an industrial facility. They are generally portable point monitors that are easy to move to specific locations where continuous gas monitoring is required. Such devices are typically deployed in both indoor and outdoor environments near or adjacent to equipment where gas hazards could occur. They are typically deployed on a permanent, semi-permanent or shorter-term basis depending on the nature of the equipment and/or the hazard risk.

For example, AGMs may be deployed around oil refinery equipment on a permanent basis during the regular operation of the refinery. In other facilities, AGMs may be deployed on a semi-permanent basis where gas hazards may be seasonal such as around farms and/or on a shorter-term basis where the gas hazard is expected to be relevant for a short time-period such as when equipment is being commissioned and/or involved in scheduled or un-scheduled maintenance.

In other scenarios, AGMs may be equipped with supplementary sensors, such as humidity, temperature, meteorological, gamma radiation, noise and other such sensors. Together, gas and other sensors deliver data to remote systems and personnel in order to better understand the environmental conditions of a site, helping to increase workplace safety. AGMs can be deployed for firefighting and hazardous materials response, providing comprehensive monitoring for a range of gases, being configurable with one or more gas sensors. When equipped with a gamma radiation sensor, AGMs can be used to protect venues, such as during football games where large crowds have gathered or ports where homeland/border security is looking to detect and prevent illicit imports of radioactive materials.

Portable AGMs are provided with power systems that enable the AGM devices to be deployed for extended periods of time and hence, include power systems providing long battery life and/or are provided with off-grid power capabilities such as a solar panel.

Portable AGMs may also be configured to enhance their capabilities to a wider range of potential hazards. For example, a portable AGM may be configured with one or more remote sampling pumps that draw sample gas through a length of tubing from a distance away from the potential hazard source allowing operators to temporarily and safely position the AGM near equipment but sample gas from one or more different areas. One example of such a deployment is configuring the AGM to the manway of a pressure vessel where an AGM is secured outside the vessel but samples gas at the manway and/or inside the vessel prior to and/or during the times it is being entered and maintained.

AGMs may also be placed along fence lines or along site perimeters to detect a chemical release (so-called fence-line monitoring). AGMs can be placed around individual areas to closely monitor for potential exposures, or at points where fixed gas detectors are not installed or have been temporarily/permanently decommissioned.

PGMs are employee-worn gas monitors that are regulated for use in many industrial scenarios. PGMs are typically worn in the worker's breathing zone and critically notify the user worker/employee of an atmospheric hazard in the area. A PGM is typically configured that should a gas event be detected occur with sufficient high- or low-concentration, the PGM will trigger a low- or high-gas alarm wherein the employee will be notified by the PGM through an audible, vibration and/or flashing lights alarm. When a high-gas alarm occurs, workers using PGMs are trained to immediately stop work and move to safety upon receiving an alarm.

PGMs typically feature a display that provides messaging to the worker that describes the hazard to support their response to the alarm. A PGM may provide other sensors and capabilities to monitor personnel safety working alone, beyond sight and sound of others. Such capabilities can include the ability to detect falls or lack of motion using inertial sensors, a request to the worker to interact with the PGM to check in and the ability to call for help using an SOS button or latch that is pulled.

LWMs are employee-worn devices dedicated to monitoring employees working alone that feature the same capabilities as a PGM but without the addition of gas sensors.

Traditional AGMs are often networked together, such as through local short-range point-to-point, mesh networks or Wi-Fi to provide enhanced functionalities within real-world work environments. Networking is used to enable information to be exchanged between AGMs to provide various functions. For example, when one AGM detects gas, the other AGMs on the network may correspondingly trigger an alarm to notify any nearby employees to leave the area. In this case, networking enables more expansive area monitoring rather than just providing an alarm to workers nearby a single AGM. In this example, nearby workers to one AGM that has received a trigger from another nearby AGM can hear or see the alarm and stay away from the hazard in the area even though they may not be within audio or visual range of the AGM where the alarm was triggered.

Further, a PGM or LWM could join the network and benefit from alarms generated by AGMs, other PGMs or LWMs. A common challenge of traditional alarm device networking is the limitation of the number of devices on a given network. In some cases, this may be as few as 25 devices and in other cases as many as 100 devices. The range of maximum devices on a network may mean that not all personnel in an area can have their PGM or LWM join a network of other AGMs and person-worn devices and, as a result, they may go uninformed of an environmental hazard in the area.

Importantly, given the relative variety and complexity of real-world working environments where gas monitoring/hazard detection is required, AGMs, PGMs and LWMs that are networked are typically configured to support the ability of individual units to communicate with one another within limits of network reliability and general wireless signal coverage.

As such, a traditional communication network cannot necessarily support the full extent of a worksite nor the practical maximum number of workers on a site due to the maximum communication range between network nodes and the relatively low maximum number of devices allowable on a network.

In a typical a real-world deployment where the work facility has a wide range of heavy industrial equipment present within large indoor or outdoor facilities, effective networking systems have utilized group networks, where to establish effective coverage and resolution within a particular area, multiple units must be able to communicate with one another to ensure that communication signals are reliably communicated throughout the area. As shown in FIG. 1, a typical network setup includes a combination of client devices (i.e. AGMs, PGMs and LWMs) and gateways that operably connect to one another through a multi-node communication systems that operate as information relays within the network.

For example, in various installations, communications nodes may be fixed location devices or may be portable devices. Typically, fixed or stationary location devices (e.g. AGMs and gateways) are located at various points within a facility in order to provide a backbone mesh or array of devices that are a known distance from other devices such that they can reliably communicate with one another. Generally, within the workspace, the spacing and layout of the AGMs and gateways is set up in order to ensure that any portable devices (PGMs and LWMs) can't be more than a maximum distance from the stationary devices. Such systems are designed such that when a portable device is moved through a facility, the portable device will be able to successively connect to different stationary devices within communication range, managing a preferred connection based on signal level or other such criteria.

As can be appreciated, group systems require significant planning to set up and maintain within a real-world industrial setting. In designing such systems, the planning phase requires a review of the size of the facility and the location of potential hazards, identification of potential dead zones within the facility that could limit communications, mapping network zones within the facility having consideration to hardware limitations of all configured devices together with an understanding of the number of workers that may be working within in an area. In addition, after an area monitoring plan is established and fixed location devices including gateways and AGMs are deployed, individual PGMs and LWMs may need to be specifically assigned to an area or zone within a facility requiring multiple steps to link individual units to particular network zones.

This can include the need to manually set up devices in the field, either by setting devices to a common network ID, connecting devices using NFC communication (e.g. Industrial Scientific iAssign) or connecting to Wi-Fi. Other systems that use for example, NB-IoT connectivity, communication is set up using a smartphone app via Bluetooth.

Further, AGMs are often deployed as part of ad hoc mesh or point-to-point networks. These networking configurations primarily use short-range/local area communication that can result in the need for multiple mesh networks to cover areas of a facility where personnel are working. This creates cumbersome user configuration workflows and the need to pack up and redeploy networks to support the movement of work crews and resources. Each network must be manually established and maintained, meaning that workers can't seamlessly move between networks, creating safety gaps where personnel may work in an area without being connected to the local mesh network. This complexity requires oversight and effort, reducing team operational efficiency. Further, to the extent that a workspace may change over time as equipment is moved, reconfigured or replaced, this can result in dead zones within the facility that can affect worker safety.

As such, these systems need to be regularly verified, maintained and updated both in the field and at the administrative level which over time may lead to situations where the systems are significant deviations from an original plan which can result in uncertainty in the effectiveness of the system should a hazard event occur.

Various examples of past systems include the Industrial Scientific Radius™ monitor. This system features Bluetooth connectivity to a smartphone or tablet, sharing data to cloud software over the internet. This system also features short-range mesh networking with the option of connecting to separate Wi-Fi, cellular and satellite gateways that bridge the ad hoc mesh network to the internet and to cloud software.

Another system is the Honeywell RigRat™ system that features the option for Wi-Fi, NB-IoT and/or Bluetooth connectivity to a smartphone but only for cloud-connected configuration management.

Another issue is that once an area monitoring system has been established, it is important that alarms and alerts are effectively managed and provide relevant information to workers. That is, the relative urgency of different alarms and alerts are dependent on a variety of factors including such variables as any detected gas, its concentration level, various environmental factors such as wind direction and how those variables may be changing over time as well as a worker's distance from the hazard. In the case of a gas release and subsequent detection, personnel must immediately leave the affected area and move to safe locations/muster points. Alternatively, alarms that relate to a lone worker event, such as a worker-down event or a fall, a different protocol initiates where nearby coworkers can be dispatched as nearby responders, instructed by remote monitoring personnel. Accordingly, it is desirable that as much information as possible is derived and evaluated to be able to issue smart alarms to workers and other stakeholders. Such alarms can include prominent alarms from AGMs equipped with internal or external loud audio alarms/sirens combined with bright light indicators and a display for a text description of the hazard, compared to a PGM that may issue more focused and personal alarms/alerts to a worker using flashing lights, sound, vibration indicators and a display for text hazard description.

Accordingly, there has been a need for improved systems that enhance the setup, maintenance and management of hazard warning systems utilizing AGMs, PGMs, LWMs and other devices. Further, such a system is required to dynamically trigger alarms and alerts for large numbers of devices within a given area.

SUMMARY

In accordance with the disclosure, a system for determining worker location within a geographical area and to deliver an alarm is described, the system comprising: one or more alarm devices (ADs) having: an AD processor, local data storage and transceiver configured to connect to a wide area network (WAN) to send and receive AD data to a central computer system (CCS); a global navigation satellite system (GNSS) receiver configured to the AD processor and to receive GNSS signals, determine AD geographic position and report AD geographic position to the CCS; the AD processor configured to receive alarm data from the CCS and deliver an alarm; the CCS having: a CCS processor configured to: store one or more pre-defined alarm boundaries for a hazard risk; receive AD geographic positions from one or more ADs as determined by the GNSS receiver of each AD; receive alert data from one or more ADs and based on the location of an AD and the pre-determined alarm boundary for the hazard risk, determine if an AD is inside or outside the pre-determined alarm boundary for the hazard risk; and, deliver an alarm to an AD within the pre-determined alarm boundary.

In various embodiments:

the AD further comprises a WAN transceiver configured to report AD geographic position to the CCS.

the AD further comprises a LAN transceiver configured to report geographic position to the CCS.

the WAN transceiver includes an AD beacon receiver configured to receive one or more nearby beacon signals and to communicate one or more received beacon IDs to the CCS.

the LAN transceiver includes an AD beacon receiver configured to receive one or more nearby beacon signals and to communicate one or more received beacon IDs to the CCS.

the CCS processor is configured to store pre-defined beacon ID geographic locations.

the CCS processor is configured to receive one or more beacon IDs and beacon ID signal levels received by an AD to compute a primary AD geographic position for the AD by: looking up a geographic location stored for the strongest beacon ID signal received at the AD; or interpolating a geographic location for the AD using weighted beacon ID signal levels received at the AD and known geographic locations of each received beacon ID signals.

the CCS is configured to prioritize an available beacon-derived location over a GNSS-derived location.

the AD processor is configured to prioritize WAN communication when available over LAN communication.

the system is configured to include one or more beacon devices within the workspace and wherein a beacon device is configured to broadcast a beacon ID.

the beacon device is configured to determine its geographic location and report its geographic location to the CCS.

the beacon device is configured with a beacon device processor to connect to a wide area network (WAN) to send and receive beacon device data to the CCS.

the beacon device is configured with WAN and LAN transceivers to report and receive data to/from the CCS.

the beacon device is configured with a beacon device global navigation satellite system (GNSS) receiver to receive GNNS data, determine beacon device geographic position and report beacon device geographic position to the CCS via the beacon device processor.

the beacon device is configured with at least one sensor configured to the beacon device processor to detect a hazard event and report hazard event data to the CCS the beacon device processor is configured to receive alarm data from the CCS and deliver an alarm.

the CCS processor is configured to mark beacon device geographic location on a digital map of a workspace.

the AD is a personal monitor configured to deliver an alarm to a user as light, vibration, haptic output, sound and/or text description on a display.

the CCS is configured to store a pre-defined alarm boundary for one or more ADs.

the CCS is configured to synchronize an alarm boundary and/or one or more sensor signal thresholds with one or more ADs when each AD connects to the CCS.

the CCS is configured to forward wind speed and with direction to each AD within a radius R when an alarm is sent to an AD.

the CCS is configured to forward hazard direction and/or distance from each AD within a radius R when an alarm is sent to an AD.

the one or more alarm devices includes at least one personal monitor and at least one area gas monitor (AGM).

the at least one personal monitor is configured to receive AD alert data messages relating to an AD alarm triggered due to AD detection sensor signals that are above a pre-determined sensor signal threshold.

the CCS is configured to assign each AD to a customer or to a fleet of ADs.

In another aspect, a method of monitoring worker location within a geographical area and deliver an alarm to a worker is described, the method comprising the steps of: within an alarm device (AD) having a global navigation satellite system (GNSS) receiver, wide area network (WAN) transceiver and AD processor configured to connect to a central computer system (CCS): connect to the wide area network (WAN) and send AD data and AD location data the CCS; receive alarm data from the CCS via the WAN; and, deliver an alarm.

In various embodiments:

the CCS executes the steps of: receiving AD geographic position and comparing AD geographic data to an alarm boundary to determine if an AD is inside or outside the alarm boundary; and, based on CCS rules, deliver an alarm to all alarm devices within the alarm boundary via the WAN.

the AD further includes a LAN transceiver configured to report geographic position to the CCS and based on CCS rules, deliver an alarm to all alarm devices within the alarm boundary via the LAN.

the AD includes a beacon receiver configured to receive one or more nearby beacon signals, further comprising the step of: reporting received beacon signal strength from each beacon signal and corresponding beacon IDs to the CCS.

the CCS processor is configured to receive beacon signal strength from each AD and corresponding beacon IDs, and is configured to execute the steps of: for a given AD, looking up a geographic location stored for the corresponding beacon ID having the strongest beacon ID signal; or interpolating a geographic location of an AD using weighted beacon ID signal strengths and the corresponding beacon IDs based on known geographic locations of each beacon ID.

the CCS processor is configured to review estimated accuracy of AD locations by comparing information location from different sources to determine which ADs within an area should be receive an alarm.

the CCS is configured to execute the step of prioritizing an available beacon-derived location over a GNSS-derived location.

the AD processor is configured to execute the step of prioritizing WAN communication when available over LAN communication.

BRIEF DESCRIPTION OF THE DRAWINGS

Various objects, features and advantages of the disclosure will be apparent from the following description of particular embodiments, as illustrated in the accompanying drawings. The drawings are not necessarily to scale, emphasis instead being placed upon illustrating the principles of various embodiments of the disclosure. Similar reference numerals indicate similar components.

DETAILED DESCRIPTION

Figure 1:
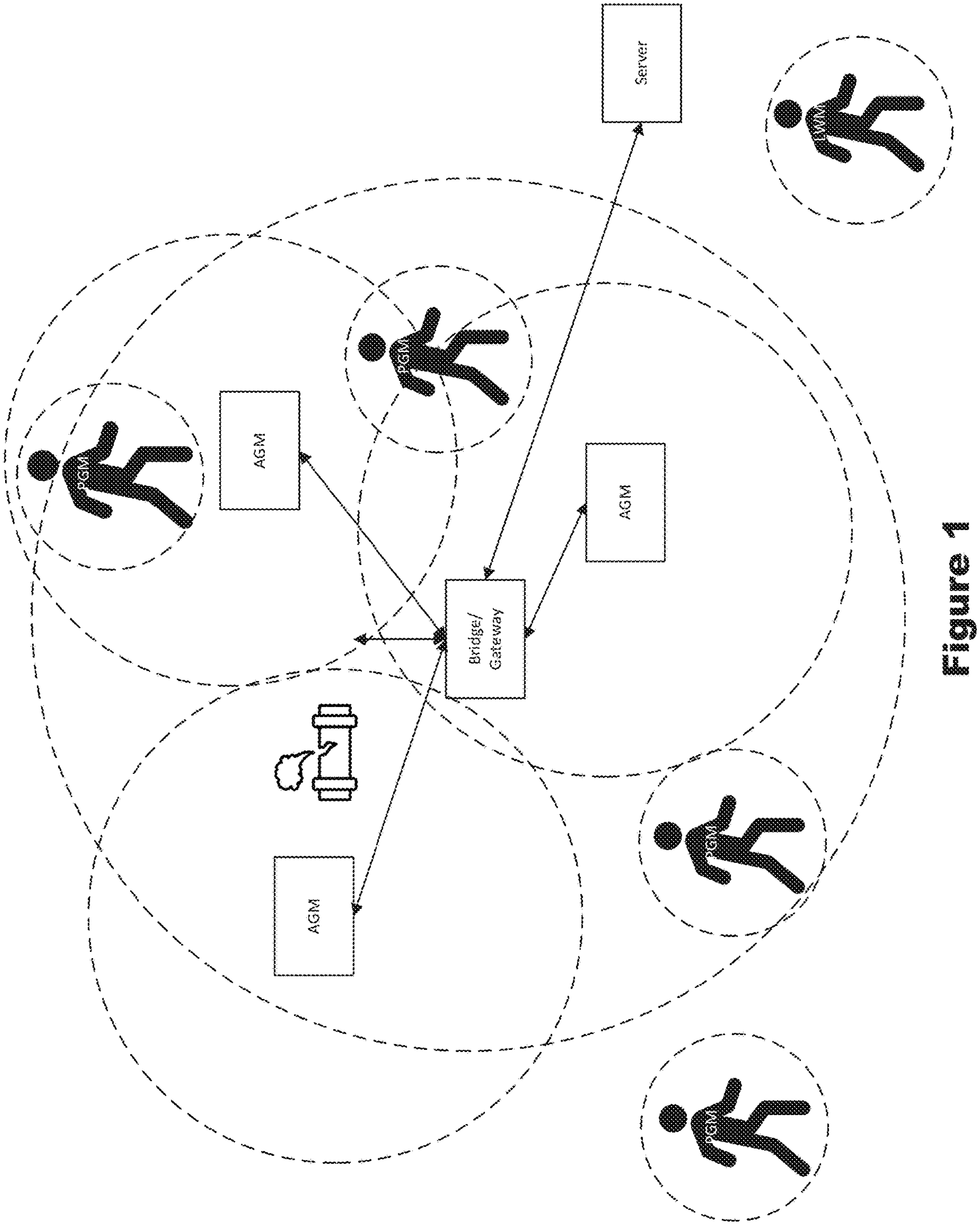
FIG. 1 is a schematic overview of a mesh-network system in accordance with the prior art.

With reference to the figures, systems and methods for managing alerts and alarms within a location are described to enhance worker safety.

Terminology

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be understood that the terms “comprises” and/or “comprising,” when used in this specification, specify the presence of stated features, steps, operations, elements, and/or components, but do not preclude the presence or addition of one or more other features, steps, operations, elements, components, and/or groups thereof. As used herein, the term “and/or” includes any and all combinations of one or more of the associated listed items.

Spatially relative terms may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures.

It will be understood that when an element is referred to as being “on”, “attached” to, “connected” to, “coupled” with, “contacting”, “configured to”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present.

It will be understood that, although the terms “first”, “second”, etc. may be used herein to describe various elements, components, etc., these elements, components, etc. should not be limited by these terms. These terms are only used to distinguish one element, component, etc. from another element, component. Thus, a “first” element, or component discussed herein could also be termed a “second” element or component without departing from the teachings of the present disclosure. In addition, the sequence of operations (or steps) is not limited to the order presented in the claims or figures unless specifically indicated otherwise.

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word “about” even though the term “about” may not expressly appear with the value, amount, or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Unless otherwise defined, all technical and scientific terms used herein have the same meaning as commonly understood by one of ordinary skill in the art to which this disclosure belongs.

Various aspects of the disclosure will now be described with reference to the figures. The disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Moreover, the drawings are not necessarily drawn to scale and are intended to emphasize principles of operation rather than precise dimensions.

Overview

As discussed above, and with reference to FIG. 1, past systems used for notifying workers generally include a number of networked devices that can communicate with one another within one or more traditional networks. Traditional networks include local mesh networks, star networks and Wi-Fi with the option of cellular/satellite gateways in the network as backhaul to a remote system. A traditional network connected to a remote system does not include capabilities to support virtual connections between AGMs, PGMs and LWMs (collectively referred to an alarm devices or ADs) as routed through the remote system. Traditional networks may include a number of ADs that are active within a local network.

For example, a typical deployment includes an AGM that may be permanently or semi-permanently located within a facility and near a potential gas source or downwind from a source. The AGM is configured to monitor for gas and will trigger an alarm in the event of a high-gas threshold is reached. When the AGM detects a high level of gas, this information is relayed to other ADs through the network directly, not through connection to a cloud system with the cloud determining the logical routing structure of alerts to each AD on the network based on geographic location of each AD. Such is also the case for other alarm-level sensor data, for example gamma radiation. A traditional network may be comprised of AGMs and/or PGMs and/or LWMs.

Numerous workers each carry a personal device (PD) (e.g PGM or LWM) with each PGM configured to monitor for gas and trigger an alarm in the event of a high-gas level being detected wherein if one or more ADs in the system triggers an alarm, an alarm may be relayed to other ADs on the network. Such is also the case for other alarm-level sensor data, for example gamma radiation.

Within this description, a hazard event is an event that has been detected by one or more sensors in one or more devices operating within a workspace that is above or below a sensor threshold. Hazard events trigger alerts which are the electronic signals delivered towards centralized control/monitoring systems 20 (see FIG. 3). Alarms are typically audible, vibration, haptic and visual notifications sent to users. Alarms are local and are delivered through the alarm devices.

The present disclosure relates to a cloud-centric network system that is configured to effectively network alarm devices together, providing virtual AD-to-AD connectivity via communications through a cloud network. For example, a data message from one AD to the cloud is received and is processed by the cloud, and if logically determined, a corresponding alarm data message is routed to one or more other ADs, triggering their device alarms. Deploying a cloud-centric network system as opposed to a traditional networking system addresses various problems identified above including network set-up, AD registration on the network, maximum number of ADs allowed on the network, a maximum number of data message hops in the network, geographic network coverage, and alarm and alert management across multiple alarm devices.

Figure 2:
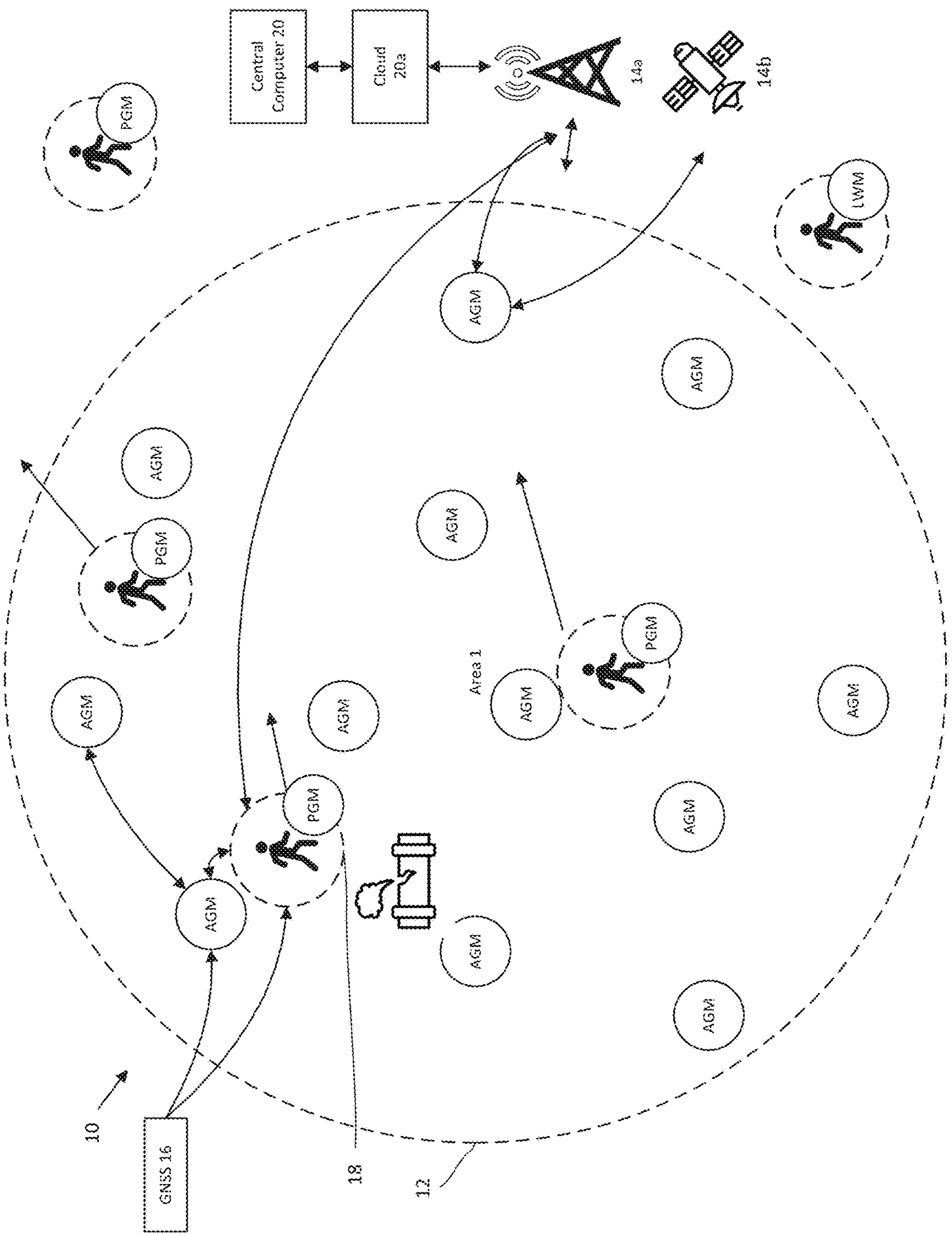
FIG. 2 is a schematic overview of a safety event alarm system (SEAS) in accordance with one embodiment of the disclosure.

As shown in FIG. 2, a safety event alarm system (SEAS) 10 is shown configured within a facility 12 that may be subject to a gas hazard. The SEAS and its operation are described with reference to a number of operating scenarios.

The SEAS 10 may include one or more fixed location ADs that are deployed in various locations throughout the facility. Typically, AGMs may be placed in relation to locations with potential gas exposure, and where personnel may be located at any moment while performing their duties and where each worker is equipped with a PD. The SEAS supports any combination of ADs including a combination of AGMs and PDs.

Figure 2A:
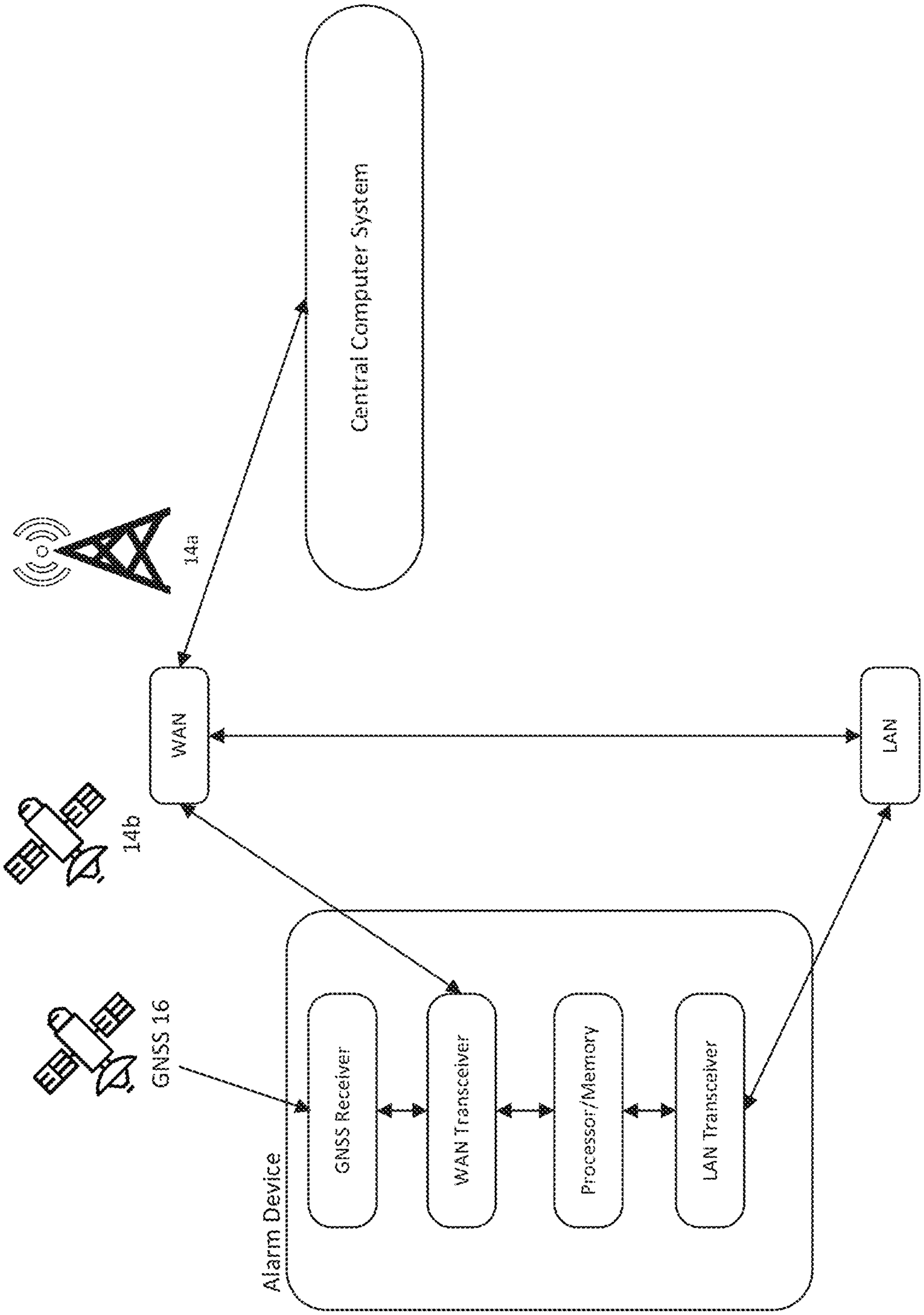
FIG. 2A is a schematic diagram of an alarm device and communication system with a Central Computer System (CCS) in accordance with one embodiment.
Figure 2B:
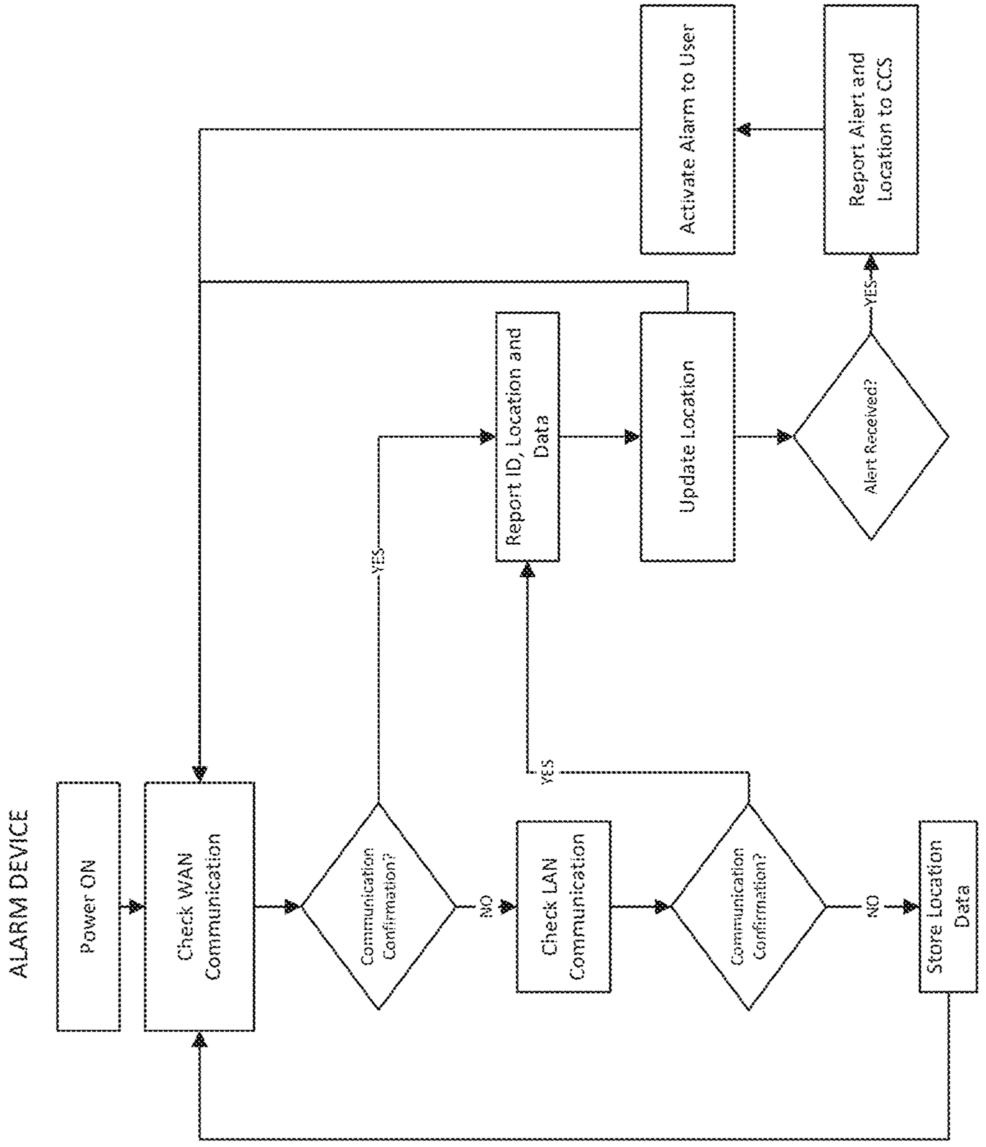
FIG. 2B is a flowchart showing a process that an alarm device follows to establish WAN or LAN communication with a CCS in accordance with one embodiment.

As shown in FIG. 2A, each AD is equipped with a GNSS receiver, a wide-area network (WAN) transceiver (e.g. cellular (incl. NB-IoT/LTE-M) and/or satellite) with the option for local area network (LAN) communications (e.g. WiFi, 915/863 MHz/2.4 GHz ISM, DECT NR+, BT or mesh network including LoRa, Wirepas, Wi-Sun, etc.) with other local ADs on the network. The AD includes appropriate processors, memory and power systems. As shown in FIG. 2B, when powered on, an AD will attempt to connect to the central system via the WAN, and if successful, it will report its ID and location (and other data) to a Central Computer System (CCS) (also referred to herein as central system).

Further, if an AD does not have a direct WAN connection, the AD will attempt to establish communication via LAN. LAN communication may be with another AD or gateway attached to the LAN with a WAN connection, thus enabling an AD to communicate to the CCS either directly or through another AD. Should the LAN not have a WAN connection to the CCS, each AD stores data locally in memory and uploads the data to the CCS either upon reconnection directly via WAN, or via other LAN-connected ADs or gateways with a WAN connection.

When two-way communication between the CCS and the AD is established, data messages received either by the CCS or AD are confirmed to the corresponding sender with an acknowledgement message. Communication is ad hoc and can be initiated by either the CCS or AD.

ADs are registered with the CCS via an ID number. Each ID number of each AD may be associated with a particular customer for tracking and billing and the CCS may register ADs for multiple customers within the CCS. That is, the CCS may monitor ADs owned/leased by each customer within the CCS as separate fleets of ADs enabling various AD configurations and/or alarm rules to be applied to a particular fleet of ADs as explained below. Alternatively, the CCS may be configured for operation with a single fleet of ADs.

Figure 2C:
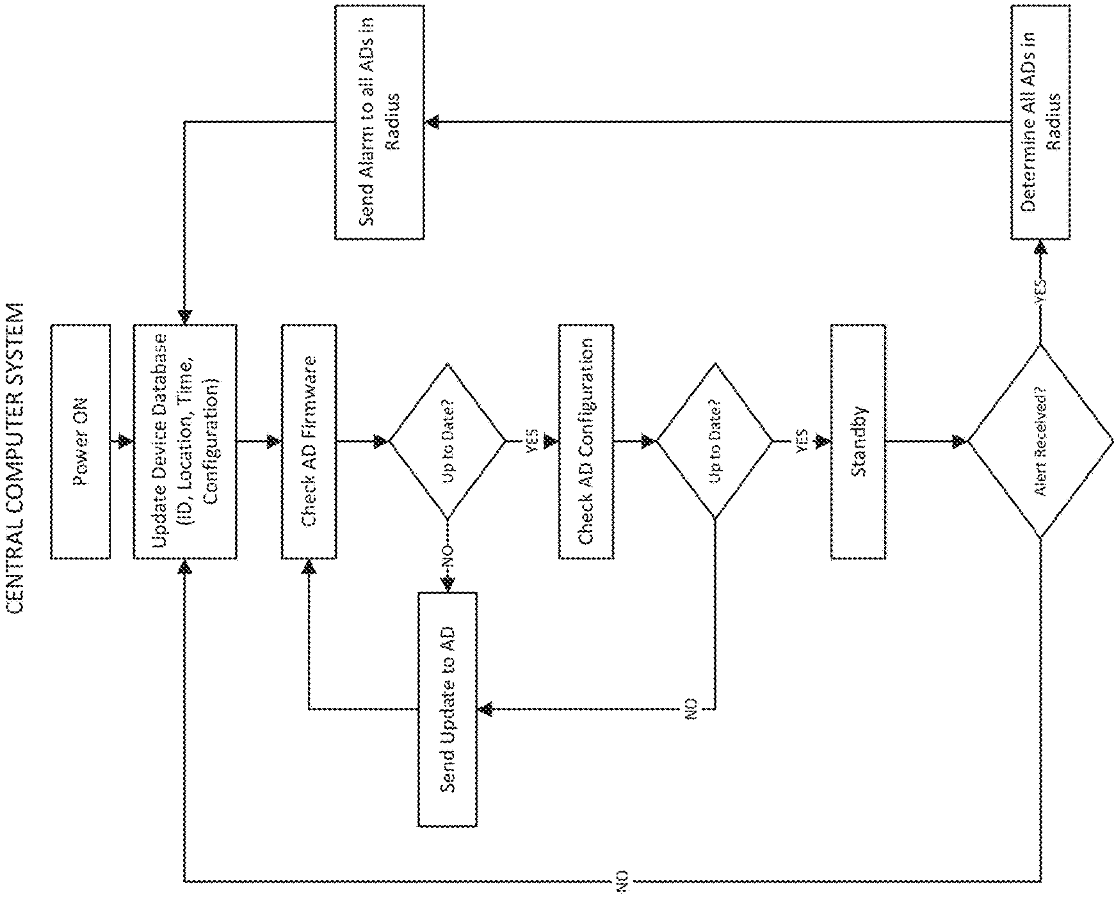
FIG. 2C is a flowchart showing a process that a CCS follows to manage firmware upgrades and alarm deployment via WAN or LAN communication with alarm devices in accordance with one embodiment.

As shown in FIG. 2C, in a typical system, after an AD has been registered and is associated with a particular customer, the CCS reviews all connecting ADs to determine if a firmware upgrade is required for each connecting AD, and initiate a firmware update over-the-air as required. The CCS can also push user-defined configurations to the AD fleet, group of ADs, or individual ADs to ensure that the fleet is appropriately set up according to the intended use case.

Figure 3:
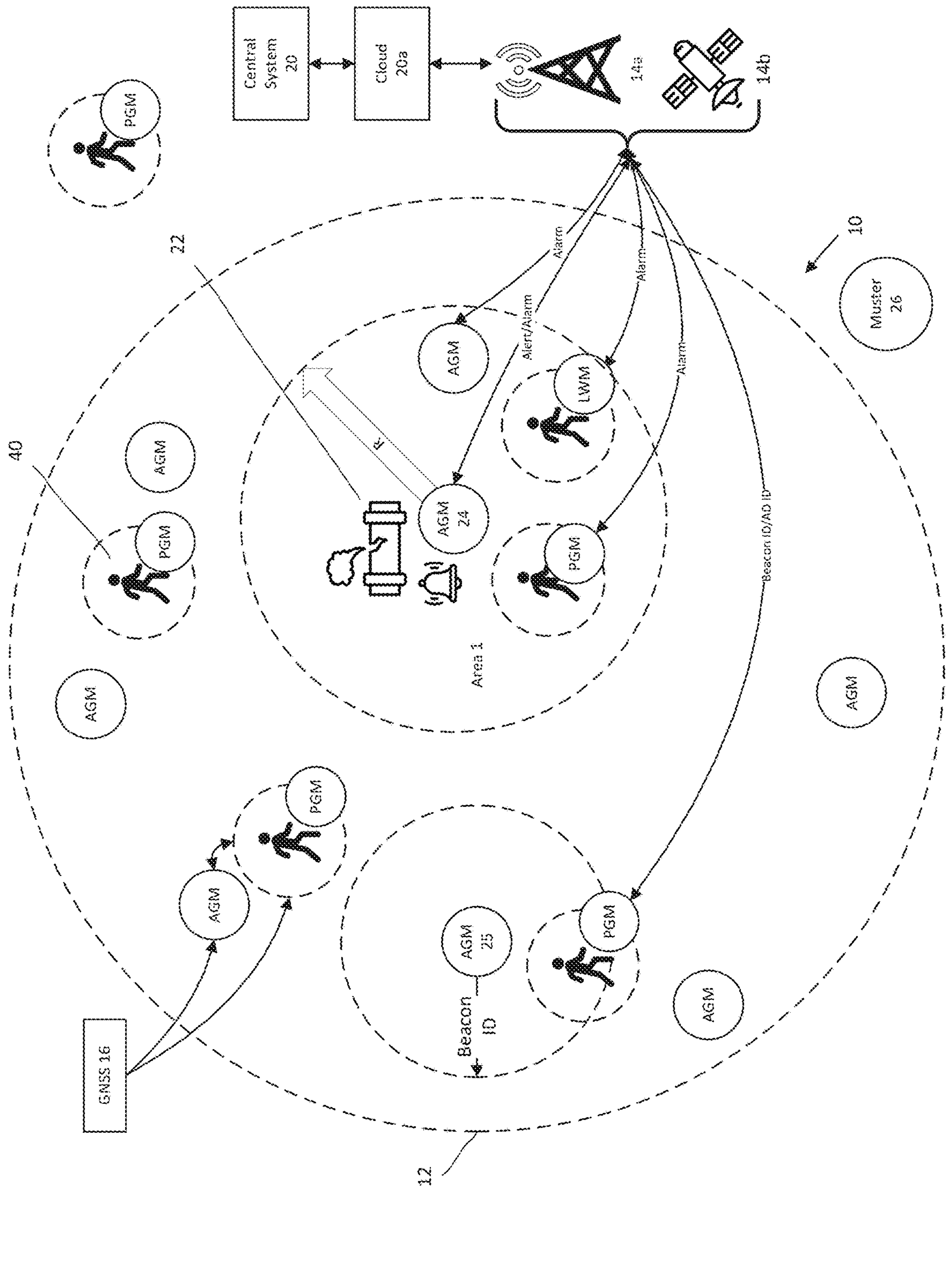
FIG. 3 is a schematic diagram of showing a communication process when an alert is triggered at an AGM and multiple alarms are delivered to Personal Devices (PDs) within a radius of the AGM in accordance with one embodiment of the disclosure.

As shown in FIG. 3, upon registration and connection to the CCS, during use, each AD can receive GNSS data from a GNSS 16. In various embodiments, each AD will have the LAN transceiver configured to include a location beacon transceiver (e.g. BT transceiver). In this embodiment, in addition to receiving GNSS data when it is available, an AD will be listening for beacon signals from standalone beacons. In various embodiments, a beacon device may be an AD such as an AGM or another device configured to determine location and report location to the CCS without configured sensors and/or alarms. In various embodiments, each beacon is pre-configured within the CCS, equipped with a prescribed location that is stored in the CCS, including an identifying name and given a layer number to support mapping within the CCS and is typically self-powered. Each beacon features a unique ID that is communicated through a proximity signal transmission to nearby ADs. This signal additionally includes the transmit power level and battery status. An AD within proximity of one or more beacons can receive its signal, determine its received signal strength and decode the transmitted data that includes the unique ID. The AD transmits one or more received beacon IDs and corresponding data to the CCS. The CCS determines the location of each AD based upon the reporting of one or more beacons by setting the location of the AD as that of the pre-configured location related to the strongest beacon signal or an interpolation that uses the pre-configured geographic locations of the received beacons.

As such, in a typical operating scenario, an AD can determine its location through computation of a GNSS position and/or by recording one or more received location beacon IDs and communicating this information to the CCS along with any other relevant data. Beacon-derived AD locations are computed by the CCS, looking up pre-configured beacon locations stored within the CCS. When available, in various embodiments, beacon locations are considered primary compared to GNSS locations, unless a GNSS location estimated accuracy value provides sufficient confidence that it shall remain primary.

In some configurations, an AD position (e.g. for a permanently installed AGM) may be set manually within the CCS either directly through a website interface or captured through a smart device app and reported to the CCS. Communication of AD location and other data via the wide-area network transceiver(s) can be triggered by a pre-configured schedule, upon request from the CCS or by a corresponding event (e.g. such as an alarm, sensor reading or low-battery event).

In various configurations, relevant data communicated to the CCS can include sensor data, wireless connection details, battery life, sensor tests, sensor calibrations, sensor errors, system errors, configuration data, system tests, debug data, push-to-talk VoIP messages, and system failures.

When ADs have been powered on and connected to the CCS either through a direct WAN connection or via a LAN that has one or more ADs or gateways with a WAN connection, the position of each AD at known locations can be marked on a digital map of the facility. Confirmation of two-way communication between the CCS and the ADs can be queried by the CCS. As noted, the location may be manually set (e.g. if a GNSS location or beacon ID is undetermined). If an alarm device, such as an AGM, is set-up in a fixed location, it is understood that it may be re-deployed at a later time, at which time its location would be updated in the system.

In various embodiments, the system is configured for portable devices (PDs) 18 (shown as a person icon) registered with the CCS 20 to substantially continuously report their location to the CCS 20 over a WAN cellular/satellite communications system network 14*a*, 14*b*. If a WAN connection to the CCS is not available or intermittent and a LAN connection that includes one or more ADs on the LAN with a WAN connection to the CCS, ADs on the LAN may use the LAN for communication to the CCS.

As shown in FIG. 2C, the CCS 20, on receiving portable device location data, will update the active location of all portable devices within a central computer system database. If location data is not received, the last received location is stored as a last-known location. If one or more beacon IDs are received and the CCS derives a location, this will also be stored.

As an example, a worker 18 wearing a portable device, is conducting regular tasks around an oil-refinery distillation tower within a facility 12 as shown in FIG. 2. The PD is in regular communication with the nearby cellular towers 14*a* and is routinely reporting GNSS location and other data to the central computer via the cloud 20*a*. Thus, the location of the worker and other data can be regularly updated such that the location of the worker is substantially known in real-time or near real-time. Other workers in the facility may be equipped with PDs that will be reporting similar data.

For the purposes of illustration in FIGS. 2 and 3, not all communication links are shown for clarity, with it being understood that all devices are capable of establishing similar communications.

As shown in FIG. 3, if a gas event 22 is detected at one of the AGMs (AGM 24 in FIG. 3) within the facility, the alert data is reported to the CCS 20. This workflow remains the same for a PGM detecting a nearby gas release. Further, both a PGM or LWM that automatically or manually trigger an alarm (e.g. a fall, lack of worker movement, or trigger of an SOS button or latch) will result in alert data reported to the CCS 20.

At the CCS 20, upon receiving the alert data, the alert may be characterized according to particular parameters, for example, being urgent or not urgent.

Specifically, in various embodiments, a hazard may be classified depending on the data received according to various standards, including appropriate safety standards for the nature of the hazard. Such standards may include particular gas concentrations for the type of gas. For example, “low”, “medium” and “high” gas concentrations (as determined by particular ranges) may trigger different alarms being sent back to PDs.

For an initial example, a gas leak may be detected as “low” in a scenario where a gas level has risen above a first gas concentration threshold. In this example, it is assumed that the classification of the alert is relevant only to workers within a pre-configured radius (e.g. 100 m) of AGM 24.

Upon receiving the alert, the CCS can look up all AGMs and PDs (workers) known to be in within the facility based on last GNSS data and/or last beacon-derived position. In addition, the CCS can, based on the known positions of all ADs, determine those workers and AGMs that are within the pre-configured radius R (e.g. 100 m) of AGM 24. It should be noted that while a radius may be an effective parameter to determine an alarm boundary, other calculations could be undertaken to define the alarm boundary including other geometric shapes, e.g. squares, rectangles, ellipses, or polygons. Further, this concept can be extended to support other pre-configured radius R magnitudes that support various hazard classification levels.

The CCS then pushes an alarm signal to all workers and AGMs inside that radius through the cellular/satellite WAN and/or via the LAN system as shown in FIG. 3.

Upon receiving an alarm, according to safety protocols, each worker may be required to acknowledge the alarm and move out of their sector to an appropriate/known muster/safety point 26.

Workers not acknowledging and/or lone workers who do not acknowledge are flagged at the CCS according to various time-based rules.

The CCS may report the last known position of personnel who have failed to evacuate to other personnel according to the safety/worker recovery protocols of the workspace.

As shown in FIG. 3, alarm signals are only sent to those PDs and AGMs within the defined radius. In this example, PDs and AGMs in other areas of the facility do not receive alarm signals.

In the event that the hazard is more serious (e.g. a “high” gas concentration threshold has been exceeded) and/or alerts have been received from more than one area of the facility, multiple alarms may result when multiple alerts have been communicated to the CCS. In this case, using the same processes mentioned above, alarms may be sent to a corresponding number of PDs and AGMs within each of the corresponding radii R.

In various embodiments, depending on configuration of the system, the specific alarm that is sent to ADs may be dependent on the nature of the alert received by the CCS from an AD. For example, a first AD may report a high gas concentration in which case all ADs in the vicinity of the first AD would receive an “urgent” alarm; whereas a nearby second AD may report a “low” gas concentration in which case all ADs in the vicinity of the second AD may receive a different alarm that may be construed to be less urgent. The relative urgency of an alarm may be different regarding text hazard description, visual, audio or haptic signals.

Importantly, at the CCS level, as the CCS has knowledge of AGM and PD locations (both GNSS and beacon-derived locations, if beacons are present and nearby the devices), it can be readily determined if a PD is within a radius or not as the boundary of the radius is known.

Recency of a location may also be considered. For example, the system may define a pre-configured age cutoff for locations, where if a location is beyond that defined timer, the device is not notified. This could be four hours as an example. This feature may be helpful to minimize the occurrence of unnecessarily searching for PDs (workers) when it can be acceptable to omit these PDs based on the age of their last known location data. The risk of not notifying a PD user that is within proximity of the originating device is offset through the installation of location beacons where GNSS signals are understood to be unavailable, weak or result in poor positioning performance due to multi-path signals that impact positioning accuracy.

Further, in various embodiments, in order to provide greater certainty of location, the system may be further configured to determine an estimated accuracy from the internal GNSS radio and/or from location beacon data that may be used to drive some assessment of whether a PD is to be considered inside a zone or outside using some statistical confidence. Generally, and regardless of the specific protocols that a CCS may be configured to perform, the CCS will typically err on the side of including ADs with alarms if the there is uncertainty with respect to location of any AD.

In various embodiments, the system can be configured such that location beacons are used to supplement GNSS where GNSS accuracy can be affected due to reflected signals or indoor operation.

Importantly, the system does not require workers to register with particular networks as in past systems, other than to initially activate a device in a customer account within the CCS. Thus, for example, if a worker is travelling from plant A of their employer to plant B, a few kilometers away, no additional registration would be required for the system's functionality to provide equal protection of that worker at plant B. Similarly, that worker could drive to a different city to their employer's plant C and no additional registration would be required for the system's functionality to provide equal protection of that worker at plant C.

In the specific situation where a worker has injured themselves, delivery of an SOS signal (either worker activated or automatic based on physiological parameters (e.g. no-motion)), the location of the worker will be known to the CCS through location updates from the AD based on GNSS position data and/or through the reporting of one or more received beacon IDs to the CCS, where the CCS computes a beacon-derived location.

With the CCS sending each alarm to corresponding ADs (e.g. AGMs and PDs), relevant data about the hazard may be included with the alarm. For example, more precise location data about the hazard may be communicated and/or information about the hazard including a relevant gas level, nature of the hazard or area geographically affected (e.g. tank farm 1).

Figure 4:
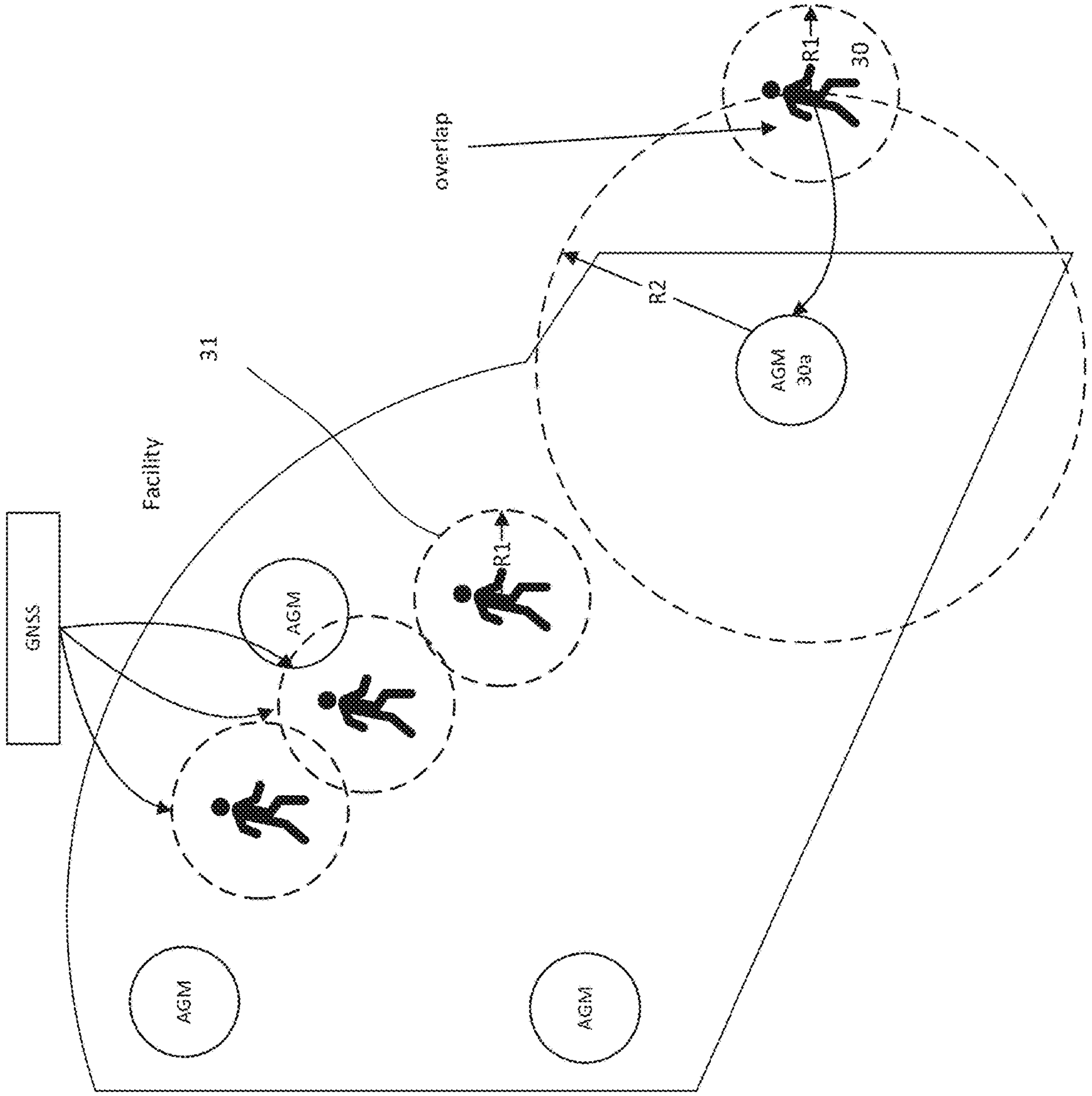
FIG. 4 is a schematic diagram of a proximity-based estimation in accordance with one embodiment of the disclosure.

For example, with reference to FIGS. 3 and 4, if AGM 24 has detected a hazard, relevant location data may be communicated to each worker and AGM within the radius R (e.g. 100 m radius). For example, worker 40 is located to the southwest of AGM 24; hence, the central system may report that the hazard is northeast and 50 m from their location (not to scale). Additionally, the CCS may be equipped with a weather service such that the CCS communicates wind speed and direction to each AD within the radius R.

In various embodiments, the central system may also communicate "all-clear" signals to all alarmed devices at the appropriate time.

Although the present disclosure has been described and illustrated with respect to preferred embodiments and preferred uses thereof, it is not to be so limited since modifications and changes can be made therein which are within the full, intended scope of the disclosure as understood by those skilled in the art.

The invention claimed is:

1. A system for determining worker location within a geographical area and to deliver an alarm, the system comprising:

one or more alarm devices (ADs) having:

an AD processor, local data storage and transceiver configured to connect to a wide area network (WAN) to send and receive AD data to a central computer system (CCS);

a global navigation satellite system (GNSS) receiver configured to the AD processor and to receive GNSS signals, determine AD geographic position and report AD geographic position to the CCS;

the AD processor configured to receive alarm data from the CCS and deliver an alarm;

the CCS having:

a CCS processor configured to:

store one or more pre-defined alarm boundaries for a hazard risk;

receive AD geographic positions from one or more ADs as determined by the GNSS receiver of each AD;

receive alert data from one or more ADs and based on the location of an AD and the pre-determined alarm boundary for the hazard risk, determine if an AD is inside or outside the pre-determined alarm boundary for the hazard risk; and, deliver an alarm to an AD within the pre-determined alarm boundary, wherein the CCS is configured to synchronize the pre-determined alarm boundary and/or one or more sensor signal thresholds with one or more ADs when each AD connects to the CCS.

2. The system as in claim 1 wherein the AD further comprises a WAN transceiver configured to report AD geographic position to the CCS.

3. The system as in claim 2 wherein the AD further comprising a LAN transceiver configured to report geographic position to the CCS.

4. The system as in claim 2 wherein the WAN transceiver includes an AD beacon receiver configured to receive one or more nearby beacon signals and to communicate one or more received beacon IDs to the CCS.

5. The system as in claim 3 wherein the LAN transceiver includes an AD beacon receiver configured to receive one or more nearby beacon signals and to communicate one or more received beacon IDs to the CCS.

6. The system as in claim 5 wherein the CCS processor is configured to store pre-defined beacon ID geographic locations.

7. The system as in claim 6 wherein the CCS processor is configured to receive one or more beacon IDs and beacon ID signal levels received by an AD to compute a primary AD geographic position for the AD by:

a) looking up a geographic location stored for the strongest beacon ID signal received at the AD; or b) interpolating a geographic location for the AD using weighted beacon ID signal levels received at the AD and known geographic locations of each received beacon ID signals.

8. The system as in claim 7 wherein the CCS is configured to prioritize an available beacon-derived location over a GNSS-derived location.

9. The system as in claim 7 wherein the AD processor is configured to prioritize WAN communication when available over LAN communication.

10. The system as in claim 1 wherein the system is configured to include one or more beacon devices within the workspace and wherein a beacon device is configured to broadcast a beacon ID.

11. The system as in claim 10 wherein the beacon device is configured to determine its geographic location and report its geographic location to the CCS.

12. The system as in claim 1 wherein the beacon device is configured with a beacon device processor to connect to a wide area network (WAN) to send and receive beacon device data to the CCS.

13. The system as in claim 12 wherein the beacon device is configured with WAN and LAN transceivers to report and receive data to/from the CCS.

14. The system as in claim 13 wherein the beacon device is configured with a beacon device global navigation satellite system (GNSS) receiver to receive GNNS data, determine beacon device geographic position and report beacon device geographic position to the CCS via the beacon device processor.

15. The system as in claim 14 wherein the beacon device is configured with at least one sensor configured to the beacon device processor to detect a hazard event and report hazard event data to the CCS.

16. The system as in claim 15 wherein the beacon device processor is configured to receive alarm data from the CCS and deliver an alarm.

17. The system as in claim 16 wherein the CCS processor is configured to mark beacon device geographic location on a digital map of a workspace.

18. The system as in claim 1 wherein the AD is a personal monitor configured to deliver an alarm to a user as light, vibration, haptic output, sound and/or text description on a display.

19. The system as in claim 1 wherein the CCS is configured to store a pre-defined alarm boundary for one or more ADs.

20. The system as in claim 1 wherein the CCS is configured to forward wind speed and with direction to each AD within a radius R when an alarm is sent to an AD.

21. The system as in claim 1 wherein the CCS is configured to forward hazard direction and/or distance from each AD within a radius R when an alarm is sent to an AD.

22. The system as in claim 1 wherein the one or more alarm devices includes at least one personal monitor and at least one area gas monitor (AGM).

23. The system as in claim 19 wherein the at least one personal monitor is configured to receive AD alert data messages relating to an AD alarm triggered due to AD detection sensor signals that are above a pre-determined sensor signal threshold.

24. The system as in claim 1 wherein the CCS is configured to assign each AD to a customer or to a fleet of ADs.

25. A method of monitoring worker location within a geographical area and deliver an alarm to a worker, the method comprising the steps of:

within an alarm device (AD) having a global navigation satellite system (GNSS) receiver, wide area network (WAN) transceiver and AD processor configured to connect to a central computer system (CCS):

connect to the wide area network (WAN) and send AD data and AD location data the CCS;

synchronize an alarm boundary and/or one or more sensor signal thresholds with one or more ADs when each AD connects to the CCS;

receive alarm data from the CCS via the WAN; and, deliver an alarm.

26. The method as in claim 25 further comprising the steps of:

within the CCS receive AD geographic position and compare AD geographic data to an alarm boundary to determine if an AD is inside or outside the alarm boundary; and, based on CCS rules, deliver an alarm to all alarm devices within the alarm boundary via the WAN.

27. The method as in claim 25 wherein the AD further includes LAN transceiver configured to report geographic position to the CCS and based on CCS rules, deliver an alarm to all alarm devices within the alarm boundary via the LAN.

28. The method as in claim 27 wherein the AD includes a beacon receiver configured to receive one or more nearby beacon signals, further comprising the step of: reporting received beacon signal strength from each beacon signal and corresponding beacon IDs to the CCS.

29. The method as in claim 28 where the CCS processor is configured to receive beacon signal strength from each AD and corresponding beacon IDs, further comprising the steps of:

a) for a given AD, looking up a geographic location stored for the corresponding beacon ID having the strongest beacon ID signal; or b) interpolating a geographic location of an AD using weighted beacon ID signal strengths and the corresponding beacon IDs based on known geographic locations of each beacon ID.

30. The method as in claim 29 wherein the CCS processor is configured to review estimated accuracy of AD locations by comparing information location from different sources to determine which ADs within an area should be receive an alarm.

31. The method as in claim 30 wherein the CCS is configured to execute the step of prioritizing an available beacon-derived location over a GNSS-derived location.

32. The method as in claim 30 wherein the AD processor is configured to execute the step of prioritizing WAN communication when available over LAN communication.

* * * * *